US012563476B2

(12) United States Patent
Mu

(10) Patent No.: US 12,563,476 B2
(45) Date of Patent: Feb. 24, 2026

(54) ACCESS CONTROL METHOD AND DEVICE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 18/267,709

(22) PCT Filed: Dec. 17, 2020

(86) PCT No.: PCT/CN2020/137387
§ 371 (c)(1),
(2) Date: Jun. 15, 2023

(87) PCT Pub. No.: WO2022/126556
PCT Pub. Date: Jun. 23, 2022

(65) Prior Publication Data
US 2024/0040484 A1 Feb. 1, 2024

(51) Int. Cl.
H04W 48/12 (2009.01)
H04W 52/02 (2009.01)
(52) U.S. Cl.
CPC ....... H04W 48/12 (2013.01); H04W 52/0229 (2013.01)
(58) Field of Classification Search
CPC ... H04W 48/12; H04W 52/0229; Y02D 30/70
See application file for complete search history.

(56) References Cited

FOREIGN PATENT DOCUMENTS

| CN | 111567126 | A | | 8/2020 | |
|---|---|---|---|---|---|
| CN | 111989973 | A | | 11/2020 | |
| CN | 112543500 | A | * | 3/2021 | ........ H04W 74/0833 |
| CN | 112690022 | A | | 4/2021 | |
| EP | 3787214 | A1 | * | 3/2021 | ............ H04W 72/23 |
| JP | 2020074637 | A | * | 5/2020 | .............. H04W 4/06 |

OTHER PUBLICATIONS

European Patent Application No. 20965572.9, Search and Opinion dated Jan. 24, 2024, 10 pages.
PCT/CN2020/137387, English translation of International Search Report dated Jul. 7, 2021, 2 pages.

* cited by examiner

*Primary Examiner* — Michael A Keller
(74) *Attorney, Agent, or Firm* — Cozen O'Connor

(57) ABSTRACT

An access control method and device are disclosed. A network device determines signalling. The signalling at least includes: a parameter related to access control of a first type of terminal or a parameter related to access control of a second type of terminal. The parameter related to the access control of the first type of terminal and the parameter related to the access control of the second type of terminal are carried in different signalling. A terminal receives signaling corresponding to a type of the terminal itself, based on the type of the terminal itself.

11 Claims, 3 Drawing Sheets

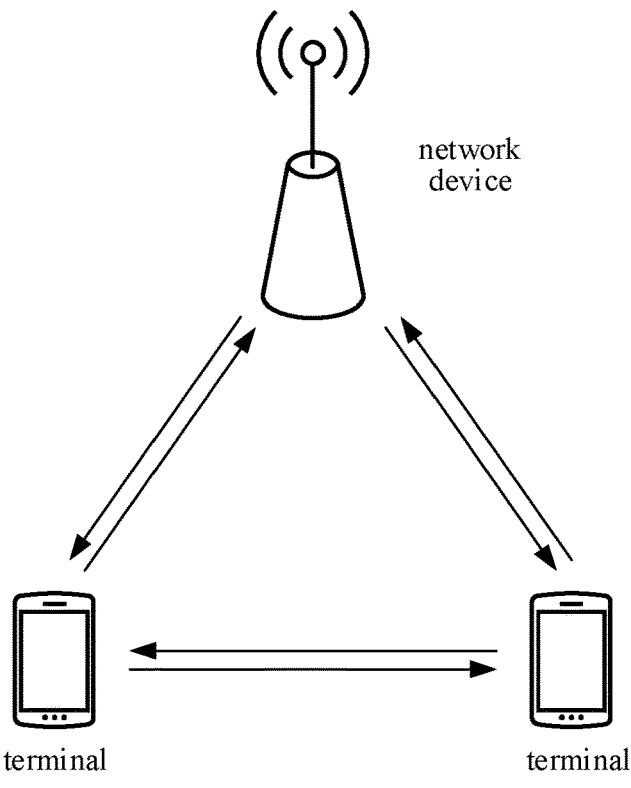
network
device
terminal                              terminal
FIG. 1
determining signaling                                    S11
FIG. 2
receiving signaling corresponding to a type of the       S21
terminal itself, based on the type of the terminal itself
FIG. 3
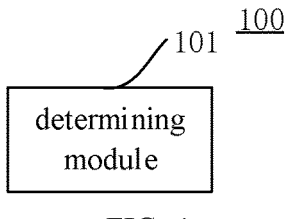
101    100
determining
module
FIG. 4

ACCESS CONTROL METHOD AND DEVICE

CROSS-REFERENCE TO RELATED APPLICATION

This application is the US national phase application of International Application No. PCT/CN2020/137387, filed on Dec. 17, 2020, the entire contents of which are incorporated herein by reference for all purposes.

TECHNICAL FIELD

The disclosure relates to the field of wireless communication technology, and in particular, to an access control method and an access control device.

BACKGROUND

In a wireless communication system, a machine type communication (MTC) technology and a Narrow Band Internet of Things (NB-IoT) technology are proposed for a low rate and high delay scenario of Internet of Things (IoT) services. Due to the development of the IoT services, MTC and NB-IoT technologies can no longer meet the speed and delay requirements of current IoT services. Therefore, a new type of terminal, a Reduced capability (Redcap) UE, or NR-lite for short, is designed to cover the requirements of the IoT services.

Since the number of Redcap terminal antennas is small and the coverage capability is relatively low, if all access control parameters are placed in a Master Information Block (MIB), available bits in the MIB are very limited and cannot effectively indicate the access control parameters of various types of Redcap UEs. If all access control parameters are placed in a Remaining Minimum SI (RMSI) Physical Downlink Control Channel (PDCCH) or a RMSI Physical Downlink Shared Channel (PDSCH), for a low-end terminal (low-end Redcap), it may be necessary to accumulate multiple cycles of PDCCH for demodulation, which is not conducive to reducing the energy use of the terminal.

SUMMARY

According to a first aspect of embodiments of the disclosure, there is provided an access control method. The method is applied to a network device and includes:

determining signaling. The signaling includes at least a parameter related to access control of a first type of terminal, or a parameter related to access control of a second type of terminal. The parameter related to the access control of the first type of terminal and the parameter related to the access control of the second type of terminal are carried in different signaling.

According to a second aspect of embodiments of the disclosure, there is provided an access control method. The method is applied to a terminal and includes:

receiving signaling corresponding to a type of the terminal itself, based on the type of the terminal itself;

the signaling including at least a parameter related to access control of a first type of terminal, or a parameter related to access control of a second type of terminal;

in which the parameter related to the access control of the first type of terminal and the parameter related to the access control of the second type of terminal are carried in different signaling.

According to a third aspect of embodiments of the disclosure, there is provided a network device. The device includes:

a processor; a memory configured to store processor-executable instructions; in which the processor is configured to determine signaling, the signaling including at least a parameter related to access control of a first type of terminal, or a parameter related to access control of a second type of terminal;

in which the parameter related to the access control of the first type of terminal and the parameter related to the access control of the second type of terminal are carried in different signaling.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the disclosure and together with the description serve to explain the principles of the disclosure.

FIG. 1 is a diagram of a communication system architecture between a network device and a terminal according to an embodiment.

FIG. 2 is a flow chart of an access control method applied to a network device according to an embodiment.

FIG. 3 is a flow chart of an access control method applied to a terminal according to an embodiment.

FIG. 4 is a block diagram of an access control apparatus applied to a network device according to an embodiment.

DETAILED DESCRIPTION

Figure 5:
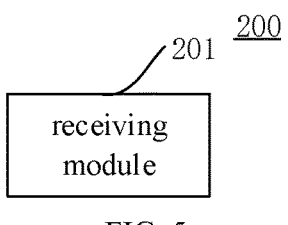
FIG. 5 is a block diagram of an access control apparatus applied to a terminal according to an embodiment.

Embodiments will be described in detail herein, examples of which are illustrated in the accompanying drawings. When the following description refers to the drawings, the same numerals in different drawings represent the same or similar elements unless otherwise indicated. The implementations described in the illustrative examples below are not intended to represent all implementations consistent with the disclosure. Rather, they are merely examples of apparatus and methods consistent with some aspects of the disclosure as recited in the appended claims.

Reduced capability UE proposes two major technologies of MTC and NB-IoT to support IoT services in communication systems such as an LTE (Long Term Evolution) 4G (fourth generation mobile communication technology) system, these two major technologies are mainly aimed at scenarios of low-speed, high-latency, such as meter reading, environmental monitoring and other scenarios. A maximum transmission rate currently supported by NB-IoT technology is several hundred kilobits per second (kbps), while the maximum transmission rate currently supported by MTC technology is several million bits per second (Mbps). However, with the continuous development of IoT services, such as the popularization of video surveillance, smart home, wearable devices and industrial sensor monitoring, these services usually require a transmission rate of tens of Mbps to 100 Mbps, and they also have relatively high requirements for latency, so it is difficult for the MTC technology and NB-IoT technology in LTE to meet the requirements of the above services. Based on this situation, the requirement to design a new user equipment in 5G NR to cover this mid-range IoT device has been proposed. In the current 3rd Generation Partnership Project (3GPP) standardization, this new terminal type is called Reduced capability UE or NR-lite (New Radio Lite) for short. There may be many different types of Redcap UEs in the communication system, such as a high-end Redcap terminal and a low-end Redcap terminal. Different terminal types may have different terminal capabilities or coverage capabilities. For example, the high-end terminal has two antennas Rx, while the low-end terminal has only one antenna Rx, so the coverage capabilities of the two terminals are different at this time.

FIG. 1 is a diagram of a communication system architecture between a network device and a terminal according to an embodiment. An access control method provided by the disclosure can be applied to the communication system architecture shown in FIG. 1. As shown in FIG. 1, the network device may send signaling based on the architecture shown in FIG. 1.

It can be understood that the communication system between the network device and the terminal shown in FIG. 1 is only a schematic illustration, and the wireless communication system may also include other network devices, such as core network devices, wireless relay devices, and wireless backhaul devices, etc., that are not shown in FIG. 1. Embodiments of the disclosure do not limit the number of network devices and the number of terminals included in the wireless communication system.

It can be further understood that the wireless communication system according to embodiments of the disclosure is a network that provides a wireless communication function. A wireless communication system may employ different communication technologies, such as code division multiple access (CDMA), wideband code division multiple access (WCDMA), time division multiple access (TDMA), frequency division multiple access (FDMA), orthogonal frequency division multiple access (OFDMA), single carrier frequency division multiple access (SC-FDMA), carrier sense multiple access with collision avoidance. According to the capacity, speed, delay and other factors of different networks, the network can be divided into 2G network, 3G network, 4G network or future evolution network, such as 5G network, 5G network can also be called a new radio (NR). For convenience of description, the disclosure will sometimes refer to a wireless communication network simply as a network.

Further, the network device involved in the disclosure may also be referred to as radio access network device. The wireless access network device may be: a base station, an evolved node B, a home base station, an access point (AP) in a WIFI system, a wireless relay node, a wireless backhaul node, a transmission point (TP) or a transmission and reception point (TRP), etc., may also be a gNB in an NR system, or may also be a component or part of a device that constitutes a base station. When it is a vehicle-to-everything (V2X) communication system, the network device may also be an in-vehicle device. It should be understood that, in embodiments of the disclosure, the specific technology and specific device form adopted by the network device are not limited.

Further, the terminal involved in the disclosure, which may also be referred to as terminal equipment, user equipment (UE), mobile station (MS), mobile terminal (MT), etc., is a device that provides voice and/or data connectivity to a user. For example, the terminal may be a handheld device with wireless connectivity, a vehicle-mounted device, or the like. At present, some examples of the terminal are: a mobile phone, a pocket personal computer (PPC), a palmtop computer, a personal digital assistant (PDA), a notebook computer, a tablet computer, a wearable device, or vehicle equipment, etc. In addition, when it is a V2X communication system, the terminal device may also be an in-vehicle device. It should be understood that the embodiments of the disclosure do not limit the specific technology and specific device form adopted by the terminal.

FIG. 2 is a flow chart of an access control method according to an embodiment. As shown in FIG. 2, the access control method is applied to a network device, and includes the following steps.

In step S11, signaling is determined.

In embodiments of the disclosure, the types of terminals include at least a first type of terminal and a second type of terminal. The terminal may be a Redcap terminal, and may include a first type of Redcap terminal and a second type of Redcap terminal according to the capabilities of the Redcap terminal. Of course, the limitation of the terminal type is not limited to the Redcap terminal, and the disclosure only uses the Redcap terminal as an example.

In embodiments of the disclosure, the signaling includes at least: a parameter related to access control of the first type of terminal, or a parameter related to access control of the second type of terminal.

The type of the terminal is a first type of terminal or a second type of terminal. The parameter related to the access control of the first type of terminal and the parameter related to the access control of the second type of terminal are carried in different signaling.

In embodiments of the disclosure, as described above, the network device determines to perform corresponding access controls through different signaling at different stages of an access process, according to specificities (such as a capacity to read and transmit data) and requirements of different types of terminals. The correspondence relationship between different types of terminals and signaling may be determined in at least one of the following manners:

the correspondence relationship between different types of terminals and signaling is given by the standard;

the network device directly sends the correspondence relationship between different types of terminals and signaling to the terminal;

the corresponding relationship between different types of terminals and signaling is determined by different types of terminals;

the correspondence relationship between different types of terminals and signaling is determined through negotiation between different types of terminals and network side equipment;

the network device implicitly indicates the correspondence relationship between different types of terminals and signaling.

In some embodiments of the disclosure, the network device sends the corresponding signaling according to the first type of terminal or the second type of terminal. The terminal determines the cell that can be accessed via the parameter related to the access control included in the signaling.

In the access control method provided by the disclosure, by determining corresponding signaling for different types of terminals, and executing the parameter related to the access control corresponding to different types of terminals in the corresponding signaling, the need for terminal to read unnecessary access control related information can be reduced, achieving the purpose of saving energy consumption.

In some embodiments of the disclosure, the signaling may be an MIB, or the signaling may be signaling carried in a PDCCH; or, the signaling may be signaling carried in a PDSCH; or the signaling may be a PDCCH scheduling RMSI; or, the signaling may be a PDSCH scheduling RMSI.

In some embodiments of the disclosure, for example, the first type of terminal is a first type of Redcap terminal with relatively low capability (for example, a Redcap UE including one antenna), and the second type of terminal is a second type of Redcap terminal with relatively high capability (for example, a Redcap UE including two antennas), or the bandwidth of the first type of terminal is smaller than the bandwidth of the second type of terminal. Of course, the above descriptions are only examples. It only needs to be satisfied that the capability of the first type of terminal is lower than the capability of the second type of terminal in the embodiments of the disclosure; the specific types of the first type of terminal and the second type of terminal are not limited.

In embodiments of the access control method of the disclosure, the network device may send the parameter related to the access control of the first type of terminal through the MIB, and send the parameter related to the access control of the second type of terminal through the signaling carried in the PDCCH.

In embodiments of the access control method of the disclosure, the network device may send the parameter related to the access control of the first type of terminal through the MIB, and send the parameter related to the access control of the second type of terminal through signaling carried in the PDSCH.

In embodiment of the access control method of the disclosure, the network device may send the parameter related to the access control of the first type of terminal through the signaling carried in the PDCCH, and send the parameter related to the access control of the second type of terminal through signaling carried in the PDSCH.

In embodiments of the access control method of the disclosure, the network device sends the parameter related to the access control of the first type of terminal through the MIB, and sends the parameter related to the access control of the second type of terminal through the PDCCH scheduling RMSI.

In embodiment of the access control method of the disclosure, the network device sends the parameter related to the access control of the first type of terminal through the MIB, and send the parameter related to the access control of the second type of terminal through the PDSCH carrying RMSI.

In embodiments of the access control method of the disclosure, the network device sends the parameter related to the access control of the first type of terminal through the PDCCH scheduling the RMSI, and sends the parameter related to the access control of the second type of terminal through the PDSCH carrying RMSI.

In embodiments of the disclosure, the parameter related to the access control of the first type of terminal is a parameter configured to indicate an access permission status of the first type of terminal.

In the access control method of the disclosure, the parameter related to the access control of the first type of terminal may be a parameter indicating that the first type of terminal is allowed to access the cell, or a parameter indicating that the first type of terminal is denied access to the cell.

In embodiments of the disclosure, the parameter related to the access control of the first type of terminal is a parameter configured to indicate a cell reselection access of the first type of terminal.

In the access control method of the disclosure, the parameter related to the access control of the first type of terminal may be a parameter indicating that the first type of terminal is allowed to access the cell, or a parameter indicating that the first type of terminal is not allowed to access the cell.

In response to the first type of terminal not being allowed to access to the cell, it is determined to indicate that the first type of terminal is supported to perform cell reselection. Alternatively, in response to the first type of terminal not being allowed to access to the cell, it is determined to indicate that the first type of terminal is not supported to perform cell reselection.

In some embodiments of the disclosure, the parameter related to the access control of the first type of terminal is a parameter configured to indicate the parameter related to the access permission status of the first type of terminal carried in the MIB.

According to the access control method of the disclosure, it may indicate that the first type of terminal is allowed to access the cell based on spare bits in the MIB, or the first type of terminal is not allowed to access the cell based on the spare bits in the MIB.

In some embodiments of the disclosure, the parameter related to the access control of the first type of terminal is a parameter configured to indicate the cell reselection access of the first type of terminal carried in the MIB.

According to the access control method of the disclosure, in response to an existence of 2 bits, a first bit is determined to indicate that the first type of terminal is allowed to access the cell, or the first bit is determined to indicate that the first type of terminal is not allowed to access the cell. A second bit is configured to indicate that the first type of terminal is supported to perform cell reselection, or the second bit is configured to indicate that the first type of terminal is not supported to perform intra-frequency cell reselection.

In embodiments of the disclosure, the existing 2 bits may be reserved bits existing in a KSSB in the MIB under a frequency range 1 (FR1).

In some embodiments of the disclosure, the parameter related to the access control of the first type of terminal is in the predefined parameter carried in the MIB. The predetermined parameter is configured to determine the access permission status of the first type of terminal.

According to the access control method of the disclosure, an access configuration for the first type of terminal may be carried in the MIB. The access configuration for the first type of terminal may be information such as SSB information or initial bandwidth part (BWP). In an implementation, in response to the access configuration for the first type of terminal being valid, it is determined to indicate that the first type of terminal is allowed to access the cell. In an implementation, in response to the access configuration for the first type of terminal being invalid, it is determined to indicate that the first type of terminal is denied access to the cell.

In some embodiments of the disclosure, the parameter related to the access control of the first type of terminal is a predefined parameter carried in the MIB. The predetermined parameter is configured to determine the cell reselection access of the first type of terminal.

According to the access control method of the disclosure, an access configuration for the first type of terminal may be carried in the MIB. The access configuration for the first type of terminal may be information such as SSB information or initial BWP. In an implementation, in response to the access configuration for the first type of terminal being valid, it is determined to indicate that the first type of terminal is allowed to access the cell. In an implementation, in response to the access configuration for the first type of terminal being invalid, it is determined to indicate that the first type of terminal is denied access to the cell, and it is determined that the first type of terminal is supported to perform cell reselection, or the first type of terminal is not supported to perform intra-frequency cell reselection.

In some embodiments of the disclosure, the parameter related to the access control of the first type of terminal is a parameter configured to indicate the access permission status of the first type of terminal carried in the PDCCH scheduling RMSI.

In the embodiments of the disclosure, unused reserved bits are included in a DCI of the PDCCH scheduling the RMSI. Based on this, the access control method of the disclosure may indicate that the first type of terminal is allowed to access the cell based on the reserved bits in the PDCCH scheduling RMSI, or the first type of terminal is not allowed to access the cell based on the reserved bits in the PDCCH scheduling RMSI.

In some embodiments of the disclosure, the parameter related to the access control of the first type of terminal is a parameter configured to indicate the cell reselection access of the first type of terminal carried in the PDCCH scheduling RMSI.

In the embodiments of the disclosure, the DCI of the PDCCH scheduling the RMSI includes unused reserved bits. Based on this, the access control method of the disclosure may indicate that the first type of terminal is allowed to access the cell based on the reserved bits in the PDCCH scheduling the RMSI, or the first type of terminal is not allowed to access the cell based on the reserved bits in the PDCCH scheduling RMSI.

In response to the first type of terminal not being allowed to access to the cell, it is determined to indicate that the first type of terminal is supported to perform cell reselection. Alternatively, in response to the first type of terminal not being allowed to access to the cell, it is determined to indicate that the first type of terminal is not supported to perform cell reselection.

In some embodiments of the disclosure, the parameter related to the access control of the first type of terminal is a predefined parameter carried in the PDCCH scheduling RMSI. The predetermined parameter is configured to determine the access permission status of the first type of terminal.

For example, the PDCCH scheduling RMSI carries an access configuration for the first type of terminal. The access configuration for the first type of terminal may be information such as SSB information or initial bandwidth part (initial BWP). In an implementation, in response to the access configuration for the first type of terminal being valid, it is determined to indicate that the first type of terminal is allowed to access the cell. In an implementation, in response to the access configuration for the first type of terminal being invalid, it is determined to indicate that the first type of terminal is denied access to the cell.

In some embodiments of the disclosure, the parameter related to the access control of the first type of terminal is a predefined parameter carried in the PDCCH scheduling the RMSI. The predetermined parameter is configured to determine the cell reselection access of the first type of terminal.

According to the access control method of the disclosure, the access configuration for the first type of terminal can be carried in the PDCCH scheduling the RMSI. The access configuration for the first type of terminal may be information such as SSB information or initial bandwidth part (initial BWP). In an implementation, in response to the access configuration for the first type of terminal being valid, it is determined to indicate that the first type of terminal is allowed to access the cell. In an implementation, in response to the access configuration for the first type of terminal being invalid, it is determined to indicate that the first type of terminal is denied access to the cell, and it is determined that the first type of terminal is supported to perform cell reselection, or that the first type of terminal is not supported to perform intra-frequency cell reselection.

In the embodiment of the disclosure, the parameter related to the access control of the second type of terminal is used to indicate the parameter related to the access permission status of the second type of terminal.

In embodiments of the disclosure, the parameter related to the access control of the second type of terminal is a parameter configured to indicate an access permission status of the second type of terminal.

In the access control method of the disclosure, the parameter related to the access control of the second type of terminal may be a parameter indicating whether the first type of terminal is allowed or not to access the cell.

In embodiments of the disclosure, the parameter related to the access control of the second type of terminal is a parameter configured to indicate a cell reselection access of the second type of terminal.

In the access control method of the disclosure, the parameter related to the access control of the second type of terminal may be a parameter indicating that the second type of terminal is allowed to access the cell, or a parameter indicating that the second type of terminal is not allowed to access the cell.

In response to the second type of terminal not being allowed to access to the cell, it is determined to indicate that the second type of terminal is supported to perform cell reselection. Alternatively, in response to the second type of terminal not being allowed to access to the cell, it is determined to indicate that the second type of terminal is not supported to perform cell reselection.

In some embodiments of the disclosure, the parameter related to the access control of the second type of terminal is a parameter configured to indicate the access permission status of the second type of terminal carried in the PDCCH scheduling RMSI.

In the embodiments of the disclosure, unused reserved bits are included in a DCI of the PDCCH scheduling the RMSI. Based on this, the access control method of the disclosure may indicate that the second type of terminal is allowed to access the cell based on the reserved bits in the PDCCH scheduling RMSI, or the second type of terminal is not allowed to access the cell based on the reserved bits in the PDCCH scheduling RMSI.

In some embodiments of the disclosure, the parameter related to the access control of the second type of terminal is a parameter configured to indicate the cell reselection access of the second type of terminal carried in the PDCCH scheduling RMSI.

In the embodiments of the disclosure, the DCI of the PDCCH scheduling the RMSI includes unused reserved bits. Based on this, the access control method of the disclosure may indicate that the second type of terminal is allowed to access the cell based on the reserved bits in the PDCCH scheduling the RMSI, or the second type of terminal is not allowed to access the cell based on the reserved bits in the PDCCH scheduling RMSI.

In response to the second type of terminal not being allowed to access to the cell, it is determined to indicate that the second type of terminal is supported to perform cell reselection. Alternatively, in response to the second type of terminal not being allowed to access to the cell, it is determined to indicate that the second type of terminal is not supported to perform cell reselection.

In some embodiments of the disclosure, the parameter related to the access control of the second type of terminal is a predefined parameter carried in the PDCCH scheduling RMSI. The predetermined parameter is configured to determine the access permission status of the second type of terminal.

For example, the PDCCH scheduling RMSI carries an access configuration for the second type of terminal. The access configuration for the second type of terminal may be information such as SSB information or initial bandwidth part (initial BWP). In an implementation, in response to the access configuration for the second type of terminal being valid, it is determined to indicate that the second type of terminal is allowed to access the cell. In an implementation, in response to the access configuration for the second type of terminal being invalid, it is determined to indicate that the second type of terminal is denied access to the cell.

In some embodiments of the disclosure, the parameter related to the access control of the second type of terminal is a predefined parameter carried in the PDCCH scheduling the RMSI. The predetermined parameter is configured to determine the cell reselection access of the second type of terminal.

According to the access control method of the disclosure, the access configuration for the second type of terminal can be carried in the PDCCH scheduling the RMSI. The access configuration for the second type of terminal may be information such as SSB information or initial bandwidth part (initial BWP). In an implementation, in response to the access configuration for the second type of terminal being valid, it is determined to indicate that the second type of terminal is allowed to access the cell. In an implementation, in response to the access configuration for the second type of terminal being invalid, it is determined to indicate that the second type of terminal is denied access to the cell, and it is determined that the second type of terminal is supported to perform cell reselection, or that the second type of terminal is not supported to perform intra-frequency cell reselection.

In some embodiments of the disclosure, the parameter related to the access control of the second type of terminal is a parameter configured to indicate the access permission status of the second type of terminal carried in the PDSCH scheduling RMSI.

In the embodiments of the disclosure, an information field of the RMSI is extended in the PDSCH scheduling the RMSI. The access control method of the disclosure may indicate that the second type of terminal is allowed to access the cell based on the information field of the extended RMSI, or the second type of terminal is not allowed to access the cell based on the information field of the extended RMSI.

In some embodiments of the disclosure, the parameter related to the access control of the second type of terminal is a parameter configured to indicate the cell reselection access of the second type of terminal carried in the PDSCH scheduling RMSI.

In the embodiments of the disclosure, an information field of the RMSI is extended in the PDCCH scheduling the RMSI. The access control method of the disclosure may indicate that the second type of terminal is allowed to access the cell based on the extended information field in the PDCCH scheduling the RMSI, or the second type of terminal is not allowed to access the cell based on the extended information field in the PDCCH scheduling the RMSI.

In response to the second type of terminal not being allowed to access to the cell, it is determined to indicate that the second type of terminal is supported to perform cell reselection. Alternatively, in response to the second type of terminal not being allowed to access to the cell, it is determined to indicate that the second type of terminal is not supported to perform cell reselection.

In some embodiments of the disclosure, the parameter related to the access control of the second type of terminal is a predefined parameter carried in the PDSCH of RMSI. The predetermined parameter is configured to determine the access permission status of the second type of terminal.

For example, the PDSCH of RMSI carries an access configuration for the second type of terminal. The access configuration for the second type of terminal may be information such as SSB information or initial bandwidth part (initial BWP). In an implementation, in response to the access configuration for the second type of terminal being valid, it is determined to indicate that the second type of terminal is allowed to access the cell. In an implementation, in response to the access configuration for the second type of terminal being invalid, it is determined to indicate that the second type of terminal is denied access to the cell.

In some embodiments of the disclosure, the parameter related to the access control of the second type of terminal is a predefined parameter carried in the PDSCH of RMSI. The predetermined parameter is configured to determine the cell reselection access of the second type of terminal.

According to the access control method of the disclosure, the access configuration for the second type of terminal can be carried in the PDSCH of RMSI. The access configuration for the second type of terminal may be information such as SSB information or initial bandwidth part (initial BWP). In an implementation, in response to the access configuration for the second type of terminal being valid, it is determined to indicate that the second type of terminal is allowed to access the cell. In an implementation, in response to the access configuration for the second type of terminal being invalid, it is determined to indicate that the second type of terminal is denied access to the cell, and it is determined that the second type of terminal is supported to perform cell reselection, or that the second type of terminal is not supported to perform intra-frequency cell reselection.

Based on the same/similar concept, embodiments of the disclosure also provide an access control method.

FIG. 3 is a flow chart of an access control method according to an embodiment. As shown in FIG. 3, the access control method is applied to a terminal, and includes the following steps.

In step S21, based on the type of the terminal itself, the signaling corresponding to the type of the terminal itself is received.

In embodiments of the disclosure, the types of terminals include at least a first type of terminal and a second type of terminal. The terminal may be a Redcap terminal, and may include a first type of Redcap terminal and a second type of Redcap terminal according to the capabilities of the Redcap terminals. Of course, the limitation of the terminal type is not limited to the Redcap terminal, and the disclosure only uses the Redcap terminal as an example.

In embodiments of the disclosure, the signaling includes at least a parameter related to access control of the first type of terminal, or a parameter related to the access control of the second type of terminal.

The type of the terminal is a first type of terminal or a second type of terminal. The parameter related to the access control of the first type of terminal and the parameter related to the access control of the second type of terminal are carried in different signaling.

In embodiments of the disclosure, as described above, the network device determines to perform corresponding access controls through different signaling at different stages of an access process, according to specificities (such as a capacity to read and transmit data) and requirements of different types of terminals. The correspondence relationship between different types of terminals and signaling may be determined in at least one of the following manners:

the correspondence relationship between different types of terminals and signaling is given by the standard;

the network device directly sends the correspondence relationship between different types of terminals and signaling to the terminal;

the corresponding relationship between different types of terminals and signaling is determined by different types of terminals;

the correspondence relationship between different types of terminals and signaling is determined through negotiation between different types of terminals and network side equipment;

the network device implicitly indicates the correspondence relationship between different types of terminals and signaling.

In some embodiments of the disclosure, the network device sends the corresponding signaling according to the first type of terminal or the second type of terminal. The terminal determines the cell that can be accessed via the parameter related to the access control included in the signaling.

In the access control method provided by the disclosure, the terminal determines the read signaling according to its own type, which can reduce the terminal reading unnecessary access control related information, achieving the purpose of saving energy consumption.

In some embodiments of the disclosure, the signaling may be an MIB, or the signaling may be signaling carried in a PDCCH; or, the signaling may be signaling carried in a PDSCH; or, the signaling may be a PDSCH carrying RMSI; or the signaling may be a PDCCH scheduling RMSI.

In some embodiments of the disclosure, for example, the first type of terminal is a first type of Redcap terminal with relatively low capability (for example, a Redcap UE including one antenna), and the second type of terminal is a second type of Redcap terminal with relatively high capability (for example, a Redcap UE including two antennas).

The terminal determines to receive the corresponding signaling according to its own type, and determines to access a cell or perform cell reselection, for example:

in response to the terminal being the first type of terminal, it is determined to receive the parameter related to the access control of the first type of terminal through the MIB. Through reserved bits in the MIB, or the access configuration of the first type of terminal carried, the access cell is determined, or the intra-frequency cell reselection is determined.

In response to the terminal being the second type of terminal, it is determined to receive the parameter related to the access control of the second type of terminal in the signaling carried in the PDCCH. Through the reserved bits in the MIB, or the access configuration of the first type of terminal carried, the access cell is determined, or the intra-frequency cell reselection is determined.

In response to the terminal being the second type of terminal, it is determined to receive the parameter related to the access control of the second type of terminal in the signaling carried in the PDSCH. Through the reserved bits in the MIB, or the access configuration of the second-type terminal carried, the access cell is determined, or the intra-frequency cell reselection is determined.

In response to the terminal being the first type of terminal, a parameter related to the access control of the first type of terminal in the signaling carried in the PDCCH is received. Through the reserved bits in the MIB, or the access configuration of the first type of terminal carried, the access cell is determined, or the intra-frequency cell reselection is determined.

In response to the terminal being the second type of terminal, it is determined to receive the parameter related to the access control of the second type of terminal in the signaling carried in the PDSCH. Through the reserved bits in the MIB, or the access configuration of the second-type terminal carried, the access cell is determined, or the intra-frequency cell reselection is determined.

In response to the terminal being the first type of terminal, a parameter related to the access control of the first type of terminal in the signaling carried in the PDCCH scheduling the RMSI is received. Through the reserved bits in the MIB, or the access configuration of the first type of terminal carried, the access cell is determined, or the intra-frequency cell reselection is determined.

In response to the terminal being the second type of terminal, it is determined to receive parameter related to access control of the second type of terminal in the signaling carried in the PDSCH scheduling the RMSI. Through the extended information field in the MIB, or the access configuration of the second type of terminal carried, the access cell is determined, or the intra-frequency cell reselection is determined.

In some embodiments of the disclosure, the Redcap terminal may read cell bar information in the MIB. In response to the read cell bar information being that the access is denied, it is determined that the information about the Redcap terminal accessing the cell is no longer read. In response to the read cell bar information being access allowed, it is determined to read the information about the Redcap terminal accessing the cell.

The transmission methods provided in all embodiments of the disclosure can be applied to the FR1 scenario, or can be applied to the FR1 time division duplexing (TDD) scenario, of course, this is only an example, and not a specific limitation for the disclosure. The above embodiments may be implemented alone or in conjunction with any of the other embodiments of the disclosure.

Based on the same concept, embodiments of the disclosure also provide an access control apparatus.

It can be understood that, in order to implement the above-mentioned functions, the access control apparatus provided by the embodiments of the disclosure includes corresponding hardware structures and/or software modules for executing each function. Combining with the units and algorithm steps of each example disclosed in the embodiments of the disclosure, the embodiments of the disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the disclosure.

FIG. 4 is a block diagram of an access control apparatus according to an embodiment. Referring to FIG. 4, the access control apparatus 100 is applied to a network device, and includes a determining module 101.

The determining module 101 is configured to determine signaling. The signaling includes at least: a parameter related to access control of the first type of terminal, or a parameter related to access control of the second type of terminal. The parameter related to the access control of the first type of terminal and the parameter related to the access control of the second type of terminal are carried in different signaling.

In the embodiment of the disclosure, the signaling is an MIB; or the signaling is the signaling carried in a PDCCH; or, the signaling is signaling carried in a PDSCH; or, the signaling is signaling carried in a PDSCH of RMSI; or, the signaling is signaling carried in a PDCCH scheduling RMSI.

In the embodiment of the disclosure, the signaling sends the parameter related to the access control of the first type of terminal through the MIB, and sends the parameter related to the access control of the second type of terminal through signaling carried in the PDCCH or PDSCH. Alternatively, the signaling sends the parameter related to the access control of the first type of terminal through the signaling carried in the PDCCH, and sends the parameter related to the access control of the second type of terminal through signaling carried in the PDSCH. Alternatively, the signaling sends parameter related to the access control of the first type of terminal through the MIB, and sends the parameter related to the access control of the second type of terminal through the PDSCH carrying RMSI or the PDCCH scheduling the RMSI. Alternatively, the signaling sends the parameter related to the access control of the first type of terminal through the PDSCH carrying RMSI, and sends the parameter related to the access control of the second type of terminal through the PDSCH carrying RMSI.

In embodiments of the disclosure, the parameter related to the access control of the first type of terminal is a parameter configured to indicate access permission status of the first type of terminal, and/or a parameter configured to indicate cell reselection access of the first type of terminal.

In embodiments of the disclosure, the parameter related to the access control of the first type of terminal is a parameter configured to indicate the access permission status of the first type of terminal carried in the MIB, and/or a parameter configured to indicate the cell reselection access of the first type of terminal carried in the MIB. Alternatively, the parameter related to the access control of the first type of terminal is a predefined parameter carried in the MIB, the predetermined parameter is configured to determine the access permission status of the first type of terminal, and/or the cell reselection access of the first type of terminal.

In embodiments of the disclosure, the parameter related to the access control of the first type of terminal is a parameter configured to indicate the access permission status of the first type of terminal carried in the PDCCH scheduling RMSI, and/or a parameter configured to indicate the cell reselection access of the first type of terminal carried in the PDCCH scheduling RMSI. Alternatively, the parameter related to the access control of the first type of terminal is a predefined parameter carried in the PDCCH scheduling RMSI, the predefined parameter is configured to determine the access permission status of the first type of terminal, and/or the cell reselection access of the first type of terminal.

In embodiments of the disclosure, the parameter related to the access control of the second type of terminal is a parameter configured to indicate an access permission status of the second type of terminal, and/or a parameter configured to indicate a cell reselection access of the second type of terminal.

In embodiments of the disclosure, the parameter related to the access control of the second type of terminal is a parameter configured to indicate the access permission status of the second type of terminal carried in the PDCCH scheduling RMSI, and/or a parameter configured to indicate the cell reselection access of the second type of terminal carried in the PDCCH scheduling RMSI. Alternatively, the parameter related to the access control of the second type of terminal is a predefined parameter carried in the PDCCH scheduling RMSI, the predetermined parameter is configured to determine the access permission status of the second type of terminal, and/or the cell reselection access of the second type of terminal.

In embodiments of the disclosure, the parameter related to the access control of the second type of terminal is a parameter configured to indicate the access permission status of the second type of terminal carried in the PDSCH scheduling RMSI, and/or a parameter configured to indicate the cell reselection access of the second type of terminal carried in the PDSCH scheduling RMSI. Alternatively, the parameter related to the access control of the second type of terminal is a predefined parameter carried in the PDSCH of RMSI, the predetermined parameter is configured to determine the access permission status of the second type of terminal, and/or the cell reselection access of the second type of terminal.

In embodiment of the disclosure, the capability of the first type of terminal to receive signaling is smaller than the capability of the second type of terminal to receive signaling.

FIG. 5 is a block diagram of an access control apparatus according to an embodiment. Referring to FIG. 5, the access control apparatus 200 is applied to a terminal, and includes a receiving module 201.

The receiving module 201 is configured to receive signaling corresponding to the type of the terminal itself based on the type of the terminal itself. The signaling includes at least: a parameter related to access control of the first type of terminal, or a parameter related to access control of the second type of terminal. The parameter related to the access control of the first type of terminal and the parameter related to the access control of the second type of terminal are carried in different signaling.

In some embodiments of the disclosure, the signaling may be an MIB, or the signaling may be signaling carried in a PDCCH; or, the signaling may be signaling carried in a PDSCH; or the signaling may be a PDCCH scheduling RMSI; or, the signaling may be a PDSCH scheduling RMSI In embodiment of the disclosure, the receiving module 201 is configured to receive the parameter related to the access control of the first type of terminal through the MIB; or receive the parameter related to the access control of the second type of terminal in the signaling carried in the PDCCH or PDSCH; or receive a parameter related to the access control of the first type of terminal in the signaling carried in the PDCCH; or receive a parameter related to the access control of the second type of terminal in the signaling carried in the PDSCH; or receive a parameter related to the access control of the first type of terminal in the signaling carried in the PDCCH scheduling the RMS; or receive a parameter related to access control of the second type of terminal in the signaling carried in the PDSCH carrying the RMSI In embodiments of the disclosure, the receiving module 201 is further configured to determine that cell bar information of the MIB is an allowance of access.

In embodiments of the disclosure, the capability of the first type of terminal to receive signaling is smaller than the capability of the second type of terminal to receive signaling.

Figure 6:
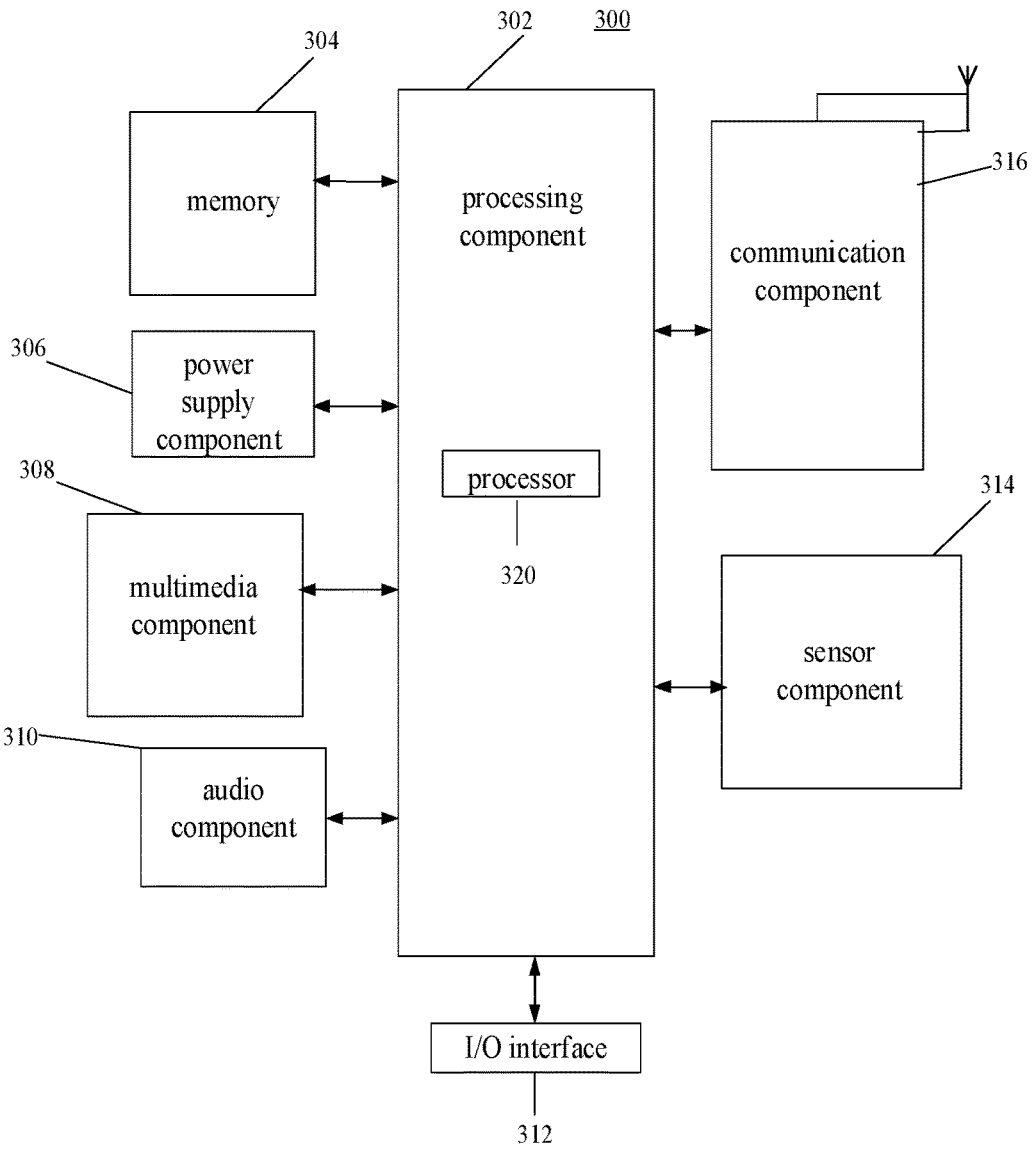
FIG. 6 is a block diagram of a device for performing access control according to an embodiment.

FIG. 6 is a block diagram of a device 300 for performing access control according to an embodiment. The device 300 may be may be a mobile phone, computer, digital broadcast terminal, messaging device, game console, tablet device, medical device, fitness device, personal digital assistant, and the like.

As illustrated in FIG. 6, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to perform all or part of the steps in the above described method. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a programmable read-only memory (PROM), a Read-Only Memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 814 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as 2G, 3G, 4G, 5G or a combination thereof. In an embodiment, the communication component 316 receives a broadcast signal or broadcast associated information from an external broadcast management system via a broadcast channel. In an embodiment, the communication component 316 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In embodiments, the device 300 may be implemented with at least one application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 304, executable by the processor 320 in the device 300, for performing the above method. For example, the non-transitory computer-readable storage medium may be a ROM, a RAM, a CD-ROM, a magnetic tape, a floppy disc, an optical data storage device, and the like.

Figure 7:
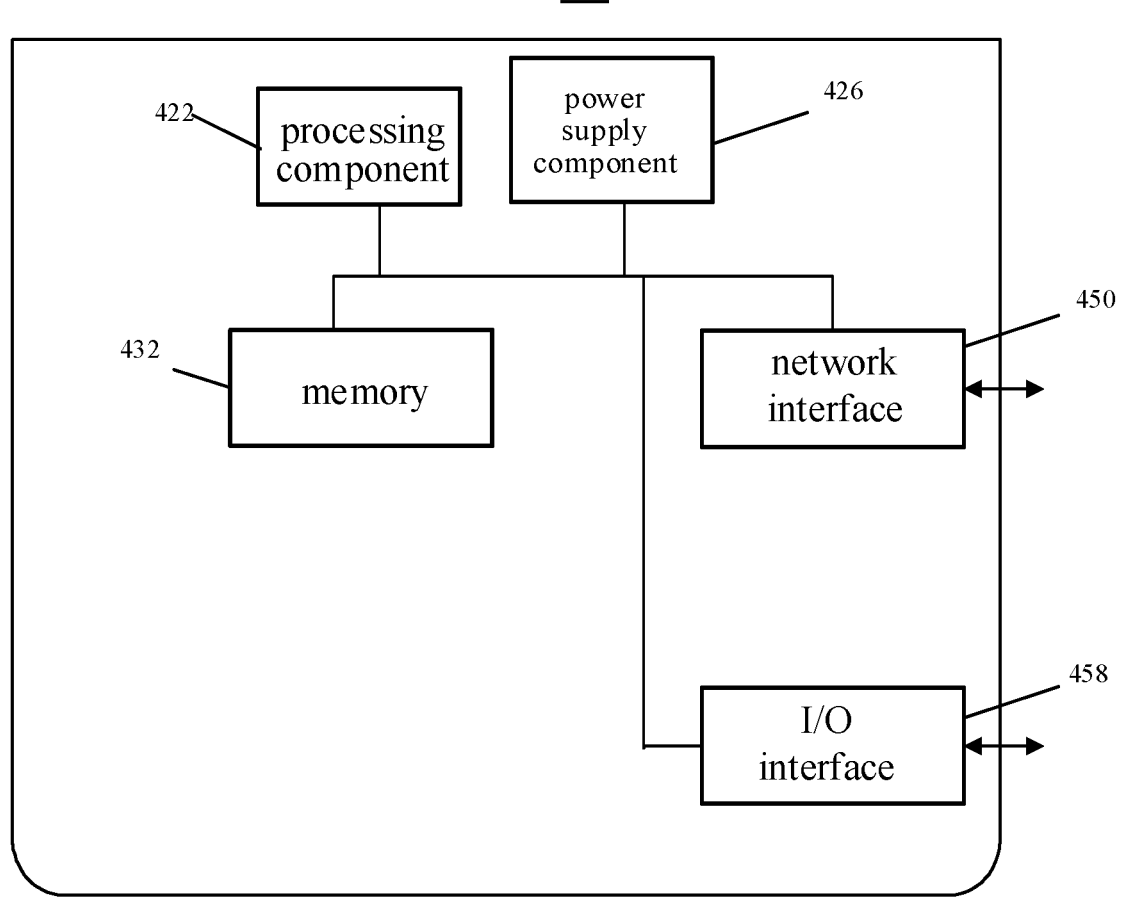
FIG. 7 is a block diagram of another device for performing access control according to an embodiment.

FIG. 7 is a block diagram of a device 400 for access control according to an embodiment. For example, the device 400 may be provided as a server. Referring to FIG. 7, the device 400 includes a processing component 422, which further includes one or more processors, and a memory resource, represented by memory 432, for storing instructions executable by processing component 422, such as an application program. An application program stored in memory 432 may include one or more modules, each corresponding to a set of instructions. In addition, the processing component 422 is configured to execute the instruction to execute the network device involved in the above method.

The device 400 may also include a power component 426 configured to perform power management of device 400, a wired or wireless network interface 450 configured to connect device 400 to a network, and an input output (I/O) interface 458. The device 400 may operate based on an operating system stored in memory 432, such as Windows Server™, Mac OS X™, Unix™, Linux™, FreeBSD™ or the like.

It should be further understood that in the disclosure, "more than one" refers to two or more, and other quantifiers are similar. "And/or", which describes the association relationship of the associated objects, means that there can be three kinds of relationships. For example, A and/or B can mean that A exists alone, A and B exist at the same time, and B exists alone. The character "/" generally indicates that the associated objects are an "or" relationship. The singular forms "a" "the", and "the" are intended to include the plural forms as well, unless the context clearly dictates otherwise.

It should be further understood that, although the terms "first", "second", "third", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

After considering the specification and practicing the disclosure here, those skilled in the art will easily think of other implementations. The present application is intended to cover any variations, usages, or adaptive changes of present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

What is claimed is:

1. An access control method, applied to a network device, comprising:
   determining signaling, the signaling being a master information block (MIB) that comprises a parameter related to access control of a first type of terminal, and the signaling being a signaling carried in a physical downlink control channel (PDCCH) scheduling remaining minimum system information (RMSI) or a physical downlink shared channel (PDSCH) carrying RMSI that comprises a parameter related to access control of a second type of terminal; and
   sending the parameter related to the access control of the first type of terminal through the MIB, and sending the parameter related to the access control of the second type of terminal through the signaling carried in the PDCCH scheduling the RMSI or the PDSCH carrying the RMSI,
   wherein the access control comprises an access permission status and a cell reselection access; and
   wherein the parameter related to the access control of the first type of terminal comprises:
   a parameter configured to indicate an access permission status of the first type of terminal; and
   a parameter configured to indicate a cell reselection access of the first type of terminal.

2. The method according to claim 1, wherein the parameter related to the access control of the first type of terminal comprises:
   a parameter configured to indicate the access permission status of the first type of terminal carried in the MIB, and a parameter configured to indicate the cell reselection access of the first type of terminal carried in the MIB;
   or
   a predefined parameter carried in the MIB, the predefined parameter being configured to determine the access permission status of the first type of terminal, and the predefined parameter being configured to determine the cell reselection of the first type of terminal.

3. The method according to claim 1, wherein the parameter related to the access control of the second type of terminal comprises:
   a parameter configured to indicate an access permission status of the second type of terminal; and
   a parameter configured to indicate a cell reselection access of the second type of terminal.

4. The method according to claim 3, wherein the parameter related to the access control of the second type of terminal comprises:
   a parameter configured to indicate the access permission status of the second type of terminal carried in the PDCCH scheduling the RMSI, and a parameter configured to indicate the cell reselection access of the second type of terminal carried in the PDCCH scheduling the RMSI;

or a predefined parameter carried in the PDCCH scheduling the RMSI, the predefined parameter being configured to determine the access permission status of the second type of terminal, and the predefined parameter being configured to determine the cell reselection access of the second type of terminal.

5. The method according to claim 3, wherein the parameter related to the access control of the second type of terminal comprises:

a parameter configured to indicate the access permission status of the second type of terminal carried in the PDSCH of the RMSI, and a parameter configured to indicate the cell reselection access of the second type of terminal carried in the PDSCH of the RMSI;

or a predefined parameter carried in the PDSCH of the RMSI, the predefined parameter being configured to determine the access permission status of the second type of terminal, and the predefined parameter being configured to determine the cell reselection access of the second type of terminal.

6. The method according to claim 1, wherein a capability to receive signaling of the first type of terminal is smaller than the capability of the second type of terminal to receive signaling.

7. An access control method, applied to a terminal, comprising:

receiving signaling corresponding to a type of the terminal itself, based on the type of the terminal itself;

the signaling being a master information block (MIB) that comprises a parameter related to access control of a first type of terminal, and the signaling being a signaling carried in a physical downlink control channel (PDCCH) scheduling remaining minimum system information (RMSI) or a physical downlink shared channel (PDSCH) carrying RMSI that comprises a parameter related to access control of a second type of terminal;

wherein receiving the signaling corresponding to the type of the terminal itself comprises:

receiving the parameter related to the access control of the first type of terminal through the MIB, or receiving the parameter related to the access control of the second type of terminal through the signaling carried in the PDCCH scheduling the RMSI or the PDSCH carrying the RMSI, wherein the access control comprises an access permission status and a cell reselection access; and wherein the parameter related to the access control of the first type of terminal comprises:

a parameter configured to indicate an access permission status of the first type of terminal; and a parameter configured to indicate a cell reselection access of the first type of terminal.

8. The method according to claim 7, wherein receiving the signaling corresponding to the type of the terminal itself further comprises:

determining that cell bar information of the MIB indicates an allowance of access.

9. The method according to claim 7, wherein a capability of the first type of terminal to receive signaling is smaller than the capability of the second type of terminal to receive signaling.

10. A network device, comprising:

a processor;

a memory configured to store processor-executable instructions;

wherein, the processor is configured to:

determine signaling, the signaling being a master information block (MIB) that comprises a parameter related to access control of a first type of terminal, and the signaling being a signaling carried in a physical downlink control channel (PDCCH) scheduling remaining minimum system information (RMSI) or a physical downlink shared channel (PDSCH) carrying RMSI that comprises a parameter related to access control of a second type of terminal; and sending the parameter related to the access control of the first type of terminal through the MIB, and sending the parameter related to the access control of the second type of terminal through the signaling carried in the PDCCH scheduling the RMSI or the PDSCH carrying the RMSI, wherein the access control comprises an access permission status and a cell reselection access; and wherein the parameter related to the access control of the first type of terminal comprises:

a parameter configured to indicate an access permission status of the first type of terminal; and a parameter configured to indicate a cell reselection access of the first type of terminal.

11. The device according to claim 10, wherein the parameter related to the access control of the second type of terminal comprises:

a parameter configured to indicate an access permission status of the second type of terminal; and a parameter configured to indicate a cell reselection access of the second type of terminal.

* * * * *